United States Patent [19]
Handl

[11] Patent Number: 6,123,754
[45] Date of Patent: Sep. 26, 2000

[54] WOOD-IMPREGNATING AGENT AND PROCESS FOR ITS PRODUCTION AND USE

[75] Inventor: Werner Handl, Altdorf, Germany

[73] Assignee: J. S. Staedtler GmbH & Co., Nürnberg, Germany

[21] Appl. No.: 08/943,964

[22] Filed: Oct. 6, 1997

[30] Foreign Application Priority Data

Oct. 4, 1996 [DE] Germany ............ 196 40 873

[51] Int. Cl.$^7$ .................. C09D 5/00; B05D 7/06
[52] U.S. Cl. .................... 106/15.05; 106/18.21; 106/18.22; 106/18.32; 106/18.33; 252/607; 516/20; 516/31; 516/53; 516/59; 516/67; 516/198; 516/200; 516/201; 516/203; 516/922; 516/923; 516/DIG. 1; 516/DIG. 3; 516/DIG. 7
[58] Field of Search .................. 106/15.05, 18.21, 106/18.22, 18.32, 18.33; 252/607; 516/20, 31, 53, 59, 67, 198, 200, 201, 203, 922, 923, DIG. 1, DIG. 3, DIG. 7

[56] References Cited

U.S. PATENT DOCUMENTS

| | | | |
|---|---|---|---|
| 4,496,613 | 1/1985 | Zagefka et al. | 427/440 |
| 4,532,161 | 7/1985 | Collins et al. | 427/440 |
| 5,098,472 | 3/1992 | Watkins et al. | 106/15.05 |

FOREIGN PATENT DOCUMENTS

| | | |
|---|---|---|
| 596 295 | 5/1994 | European Pat. Off. . |
| 393 306 | 9/1994 | European Pat. Off. . |
| 553 407 | 1/1995 | European Pat. Off. . |
| 510 435 | 3/1995 | European Pat. Off. . |
| 695 608 | 7/1995 | European Pat. Off. . |
| 39 11 091 | 11/1991 | Germany . |
| 42 24 510 | 6/1994 | Germany . |
| 43 13 219 | 10/1994 | Germany . |
| 02015010 | 1/1990 | Japan . |
| 05096514 | 4/1993 | Japan . |

OTHER PUBLICATIONS

JAPIO Patent Abstract No. JP402252503A, abstract of Japanese Patent Specification No. 02–252503. (Oct. 1990).

*Primary Examiner*—Anthony Green
*Attorney, Agent, or Firm*—Kenyon & Kenyon

[57] ABSTRACT

The invention relates to a wood-impregnating agent, which is an emulsion, dispersion or solution of a cationic, quaternary, amphoteric and/or special non-ionic surfactant, the surfactant or surfactants being poorly soluble in water and the dispersion or emulsion having a mean particle size diameter or a mean droplet size diameter smaller than 1 $\mu$m. Preferable surfactants include cationic and/or quaternary surfactants or compounds from the group of imidazolines, benzyls, alkyls, dialkyls, monoalkyl-trimethyl, dialkyl-dimethyl, methyl-dialkoxy-alkyl, dialkylmethylbenzyl, diamidoamine and/or cationic and/or quaternary surfactants or compounds from the group of complex diquaternary compounds and/or the group of compounds which assume a cationic character in acid medium and/or non-ionic compounds from the group of fatty amine oxides, amine ethoxylate, and/or adducts of an ethylene oxide, which can be protonated on an heteroatom and/or amphoteric compounds from the group of betaines and/or ampholytes. For the use of the impregnating agent the boards to be impregnated are first placed in a steel container and secured against floating, then the container together with its contents are evacuated and left with a vacuum of 80 to 95% for 10 to 25 minutes. Afterwards the impregnation liquor is introduced into the container while destroying the vacuum and the wood kept in it for 1 to 6 hours. Thereafter first the impregnation liquid and then the wood is removed from the container.

10 Claims, No Drawings

WOOD-IMPREGNATING AGENT AND PROCESS FOR ITS PRODUCTION AND USE

BACKGROUND OF THE INVENTION

1. Field of the Invention

The invention relates to a wood-impregnating agent as well as the process for its use, especially for the impregnation of wood to be worked mechanically, such as pencil wood for writing, drawing, marking and/or painting pencils of every kind that can be sharpened, and the objects made therewith.

2. Description of Related Art

Wood impregnating agents as well the process for their use for impregnation are fundamentally known. Thus, in claim 1 of German Patent DE-OS 4313219 A1 a process is proposed for the impregnation of wood, seeking chiefly to obtain water-repelling properties by the use of polysiloxanes.

This process is not suitable for the treatment of pencil wood if for no other reason than that it raises toxicological problems. This also applies to the process proposed in claim 2 of European Patent 0393306 B1.

Claim 3 of European Patent 0510435 B1 provides for a process for wood impregnation which starts out from tar oils. The impregnating agents must first be brought to suitable viscosity by temperature. The same is also true of the process described in claim 4 of German Patent 4224510 C1.

The objective of all these known impregnating agents is especially to improve resistance to weathering and fungi. None of these publications discloses the treatment of wood to be specially worked mechanically, especially pencil wood, not to mention an improvement of their mechanical workability.

In claim 5 of European Patent 0596295 A1 a stain is proposed for the blackening of wood. This stain does refer to pencil wood, but it is aimed pre-eminently at a desired staining.

As according to claim 6 of European Patent 0553407 B1, here too acid azo dyes are proposed for wood staining, in suitable mixture which, as every colorist knows, leads to black. The stain proceeds from an improved penetrability, an effect that is achieved solely by the use of surface-active agents, known as wetting agents, by lowering surface tension.

If one wishes to impregnate relatively large sizes of wood, e.g., such as those that require more than 5 mm depth of penetration, the lowering of surface tension is no longer sufficient.

Moreover, the effectiveness in other types of wood can only be achieved by uneconomical impregnation times. Furthermore, the paraffin dispersion produces an insufficient gliding and lubricating effect for heavy-duty machines and tools.

European Patent 0695608 (claim 7) proposes a stain and a process for the dyeing of wood which is essentially based on the known teaching of wood dyeing which is intended to prevent discoloration by buffering of the pH value and the complexation of undesirable ions.

As already mentioned in carefully considering European Patent 0596295 A1 (claim 5), the improved penetrability postulated is not effective at comparatively great depths of penetration. With the introduction of buffer substances which set the pH >7 and the use of complexing agents, any substantivity of ionogenic compounds is destroyed. Here improvement of the workability can be expected only with small wood sizes and with already readily workable wood, such as incense cedar or jelutong.

German Patent 3911091 C2 (claim 8) describes an aqueous impregnation solution which, besides inorganic salts, such as silicates, borates, carbonates and/or phosphates, also provides waxes and amines. The purpose in so doing is to bind the acids as well as the formaldehyde contained in the wood, so that when it is used for packing wood it does not cause any corrosion of the packaged products. Moreover, this seeks to provide hydrophobicity. Improvement of workability can not be achieved thereby.

By comparison, the object of the invention is to create an impregnating agent or an impregnating dispersion and/or emulsion for wood which penetrates deeply into the wood and/or improves the mechanical workability of the wood in such a way, for example, that even with fast machines no burn spots occur and the surface is not frayed.

The impregnated wood should not be impaired therewith and/or thereby in either its glue-bonding ability or its varnishing ability. Furthermore, even wood that is difficult to work or poorly sharpenable should still have the described advantages after its impregnation.

SUMMARY OF THE INVENTION

The object of the invention is therefore an impregnating agent and/or the use of an impregnating emulsion which penetrates deeply in all types of wood and imparts to the wood and the manufactured objects thereof good workability and sharpenability.

In accordance with the invention, this is achieved by providing a wood-impregnating agent, which is an emulsion, dispersion or solution (preferably aqueous) of a cationic, quaternary, amphoteric and/or special non-ionic surfactant, the surfactant or surfactants being poorly soluble in water and the dispersion or emulsion having a mean particle size diameter or a mean droplet size diameter smaller than 1 $\mu$m.

The surfactants to be selected should be cationic and/or quaternary surfactants or compounds from the group of imidazolines, benzyls, alkyls, dialkyls, monoalkyl-trimethyl, dialkyl-dimethyl, methyl-dialkoxy-alkyl, dialkylmethylbenzyl, diamidoamine and/or cationic and/or quaternary surfactants or compounds from the group of complex diquaternary compounds and/or the group of compounds which assume a cationic character in acid medium and/or non-ionic compounds from the group of fatty amine oxides, amine ethoxylate, and/or adducts of an ethylene oxide, which can be protonated on an heteroatom and/or amphoteric compounds from the group of betaines and/or ampholytes.

For the use of the impregnating agent the boards to be impregnated are first placed in a steel container and secured against floating, then the container together with its contents are evacuated and left with a vacuum of 80 to 95% for 10 to 25 minutes. Afterwards the impregnation liquor is introduced into the container while destroying the vacuum and the wood kept in it for 1 to 6 hours. Thereafter first the impregnation liquid and then the wood is removed from the container.

DETAILED DESCRIPTION OF THE INVENTION

Surfactants from groups mentioned above are known to have a marked tendency to be absorbed on negatively charged surfaces, especially by hair and textile fibers, and to make these combable and pliable. It was now found that these surfactants have an extraordinarily great affinity to the celluloses and hemicelluloses of the wood and are adsorbed there. This is surprising in that neither the celluloses nor the hemicelluloses are freely accessible, but are on the contrary present in the wood matrix in firmly bound form. It can further be assumed that the surfactants mentioned have a softening effect on the middle lamella lignin of the wood. The extensive presence of the surfactants on the wood fibers, in the cellular lumina as well as in the pores and hollow spaces ensures sufficient tool lubrication while simultaneously lowering fiber stiffness. This synergism has the effect that, e.g., during a planing operation at high speeds no fibers will be loosened or torn out and that a smooth surface will thus ensue.

In one preferred embodiment primarily such cationic, quaternary, amphoteric or special non-ionic surfactants are used for the impregnation of pencil woods which have poor water solubility.

This ensures that the substances in unvarnished pencils are not loosened out by hand sweat and/or saliva.

To achieve good penetrability, an emulsion or dispersion is prepared from the poorly soluble or insoluble substances. These emulsions or dispersions are especially characterized in that the dispersed phase has a mean particle or droplet diameter of less than 1.0 μm. But also generally usable are dispersions or emulsions which have a mean particle or droplet size between 0.4 and 1.2 μm, preferably between 0.6 and 0.95 μm.

With the impregnation especially of wet or freshly cut woods having a moisture content of 80 per cent by weight or more, it was surprisingly found that especially fast penetration occurs when the above-mentioned finely dispersed systems are used.

This is all the more surprising because an exchange of water or sap against impregnation liquid has to occur here. Without wishing to link the process to any specific theory, it can be assumed that the particles or fluid areas of the finely dispersed systems have an extreme diffusion tendency at diameters of less than 1.0 μm. This effects a convective substance exchange that is additionally supported by osmotic processes.

The use of elevated temperatures hastens these processes additionally. The same correlations apply with the additional use of [relatively] higher pressure.

Decisive in disperse systems are the size of the exchange surfaces as well as the thickness of the boundary layers. The specific interface boundary surface depends hyperbolically on the particle diameter. With the proposed disperse systems having particle sizes of less than 1 μm the specific exchange surface is approximately 10,000,000 $m^2/m^3$.

In addition, it has been found that finely dispersed systems <1 μm have excellent storage stability because of their flow forces and prevent sedimentation or creaming. The kinetic momentum of the particles is in fact proportional to the third power of their diameter. With particles of <1 μm there increasingly occur only "encounters" but no collisions between the particles in media at rest. This prevents aggregation and, hence, coagulation of the particles.

The emulsions or dispersions remained stable over many months. Only influences that limit or hinder the kinetic capability of the particles, such as freezing, cause the finely dispersed phase to be destroyed.

The production of finely dispersed systems occurs preferably in an emulsifying machines which operate according to the high-pressure expansion principle. In this procedure a preliminary emulsion is extruded through a nozzle at high pressure. In a homogenizing valve it passes through a cavitation zone of high power density, in which suspended particles or droplets are destroyed or cleaved under the impact of high local tensile, compressive and shearing stresses. No special demands need be made on the production of the preliminary emulsion. The latter can be produced by agitation or rotor/stator systems.

Possible cationic and/or quaternary compounds are those of the imidazoline, benzyl, alkyl, dialkyl, monoalkyltrimethyl, dialkyl-dimethyl, methyl-dialkoxy-alkyl, dialkylmethylbenzyl, diamidoamine group as well as complex diquaternary compounds. But also suitable are such compounds that assume a cationic character in acid media. These can also be non-ionic compounds, provided they can be protonated on a heteroatom. This applies to the fatty amine oxides, amino ethoxylates, and the adducts of ethylene oxide. The amphoteric compounds comprise the betaine and ampholyte group.

It is known that during impregnation and depending on their anatomy, i.e., depending on their wood structure, and whether heartwood or sapwood is involved, the woods absorb up to 200 per cent by weight of the impregnation liquid. Experience has shown that the protracted drying necessary requires a very tight process management because otherwise the reject rates cannot be justified. The reasons for this are complex. The most important of these are warping, deformation and dry cracks due to extensive dimensional changes under uncontrolled dehydration.

Due to the infiltration of water or the high moisture present in the wood at the start of drying, there is a considerable increase in immediate elastic deformation, especially at high temperatures. In addition, hydrostatic stresses become evident as well, particularly in tangentially cut woods. These occur when the wood is deprived of free water via its pore system. A meniscus, arising at the water/air interface, produces a hydrostatic tensile stress in the water behind it (with decreasing capillary radius, the stress increases); when this stress exceeds the compression strength of the wood, cell invasion ensues. A high proportion of such deformation remains as plastic deformation upon cooling of the deformed wood. The deformation is then largely determined by the drying gradient (ratio of the moisture of the wood at the time to the equilibrium moisture corresponding to the drying climate). The higher the drying gradient, the larger will be the proportion of deformed woods. As a result of the softening of the middle lamella lignin mentioned above, the cell walls now have sufficient flexibility to buffer the cell invasion during drying. This effect is surely assisted by the presence of the surfactants, which are not volatile and moreover have some measure of water retention. In other words, not only is the water released with delay, but the non-volatile surfactants remain in the hollow spaces and stabilize them.

The goal of creating and using an impregnating emulsion that penetrates deeply in almost all types of wood and imparts good workability and sharpenability to them is achieved with the proposed impregnating agent.

The production of lead pencils and colored pencils has hitherto been tied almost exclusively to the use of incense cedar, jelutong or Weymouth pine. Because of their structure and density, these woods are relatively easy to impregnate. Here aqueous paraffin emulsions were adequate to ensure the required processability and sharpenability. The fact that species of the above-mentioned pencil woods are becoming increasingly rare and expensive, and especially that pencil production machinery is increasingly rapid, calls for alternatives. Modern grooving and planing machines operate today at speeds that are definitely over 40 meters per minute, so that conventionally impregnated woods no longer have the required gliding and lubricating capability. This results in burn spots and rough surfaces, not to mention the fact that other woods can not be introduced because they lack the capacity to be impregnated.

EXAMPLES

The invention is described in greater detail on the basis of the following examples:

I. Impregnating agent

Example 1

35.00 per cent by weight of 1-stearic acid amidoethyl-2-stearyl-3-methylimidazoline methosulfate is mixed with 65.00 per cent by weight of water while stirring. The mixture is then dispersed under pressure in a high-pressure homogenizer, the liquid being pressed through a valve and expanded. The dispersion has a mean particle size of 0.9 $\mu$m and can be diluted as desired.

Example 2

38.00 per cent by weight of alkyl dimethyl benzyl ammonium chloride is mixed with 62.00 per cent by weight of water while stirring. The mixture is then dispersed in accordance with Example 1. The dispersion has a mean particle size of 0.85 $\mu$m. This emulsion has a fungicidal and bactericidal effect. This was found to be not only a stable impregnation liquor especially against microbial attack but the wood treated with it exhibited preservation characteristics, in addition to improved workability properties. The wood was especially resistant to blue rot.

Example 3

40.00 per cent by weight of distearyl dimethyl ammonium chloride is predispersed in 60.00 per cent by weight of water by means of a stirrer. The preliminary dispersion is dispersed in accordance with Example 1. The dispersion has a mean particle size of 0.85 $\mu$m and can be diluted with water as desired.

Example 4

35.00 per cent by weight of stearin amine ethoxylate with 5 mol ethylene oxide is predispersed in heated water using a stirrer and the pH made acidic with an acid. Any desired acid can be used for this. Orthophosphoric acid is suitable because of its anticorrosive action and is preferred because it has been approved as a food additive. The preliminary dispersion is dispersed at 350 bar in accordance with Example 1. The dispersion has a mean particle size of 0.95 $\mu$m.

The impregnation liquors can, of course, be dyed in order to impart to the impregnated woods the desired color. This can be desirable, especially when shading special kinds of wood, to bring out the grain texture, mask defects in the wood or achieve optical effects.

Suitable dyestuffs are known to be introduced here, as is proposed, for example, in German Patent 0553407 B1 (claim 6) or European Patent 0596295 A1 (claim 5). However, such dyes are not always physiologically unobjectionable and often have a middling fastness to light. Within the framework of the invention, it was found that pigments also infiltrate into the wood under the above conditions provided they have a particle size that is comparable to or smaller than that of the disperse phase and their wetting agent system agrees with their introduction into cationic systems. Such extremely fine-particle pigments are available commercially as aqueous pigment preparations.

Example 5

32 per cent by weight of distearyl dimethyl ammonium chloride is predispersed in 67.2 per cent by weight of water using a stirrer. The preliminary dispersion is dyed with 0.8 per cent by weight of a 20% aqueous preparation of brown 25 pigment, CI 12510, having an average particle size of 0.071 $\mu$m. The preliminary dispersion is dispersed in accordance with Example 1. The dispersion has a mean particle size of 0.85 $\mu$m and can be diluted with water, as desired, to application concentrations.

II. Impregnation of Wood

Example 6

8 m$^3$ of Weymouth pine boards, 20.0 mm×80.0 mm×2000 mm in size, with a moisture content of 15.0 per cent by weight, are placed beforehand into a cylindrical steel container having a diameter of 1600 cm and a length of 8000 cm and secured against floating. The container and its contents are then evacuated and left at a 90% vacuum for 15 minutes. 8000 liters of the impregnation liquor prepared in accordance with Example 1 and diluted to 8.0 per cent by weight of active substance are then sucked into the container by destroying the vacuum.

The wood now under the liquid level is exposed to a pressure of 12.0 bar and maintained for 120 minutes. During this time the used-up portion of the impregnation liquor is replenished through a pump. Then the impregnation liquid is pressed or pumped out of the container. By establishing an aftervacuum for approximately 10 minutes the impregnation liquid can be prevented from dripping off. The wood boards are completely saturated by the impregnation liquor and can be dried in the conventional way.

After drying the boards had an active content averaging 6.5 per cent by weight and could be sawed off into small pencil boards 73×5×185 mm in size. The small boards showed excellent processability and sharpenability. Moreover, the shavings from the sawing and planing could be perfectly removed because of the antistatic property of the 1-stearic acid amidoethyl-2-stearyl-3-methyl imidazoline methosulfate in the wood.

Example 7

8 m$^3$ of freshly cut poplar boards, 20.0×80.0×2000 mm [in size], having a water content averaging 80 per cent by weight, are placed beforehand into a container in accordance with Application Example 1 and secured against floating. The impregnation liquor produced in accordance with Example 1 and diluted to 12.0 per cent by weight of active substance content is pumped into the container and subjected to a liquid pressure of 14 bar. This pressure is maintained for 240 minutes, with the impregnation liquid being kept in circulation during this time. Such circulation is necessary because in the case at hand wood sap is exchanged with the impregnating agent and this would lead to local concentration differences.

Then the impregnation liquor is pumped out of the container and an aftervacuum is established for 10 minutes to prevent dripping. The wood boards are completely saturated with the impregnation liquor and can be dried in the conventional manner. After drying, the boards were found to have an active substance content averaging 6.0 per cent by weight and could be sawed into small pencil boards 73×5× 185 mm in size.

Example 8

8 m³ of freshly cut poplar boards, 20.0×80.0×2000 mm [in size], having a water content averaging 80 per cent by weight, are placed beforehand into a container in accordance with Application Example 1 and secured against floating. The impregnation liquor produced in accordance with Example 5 and diluted to 12.0 per cent by weight of active substance content is heated to 85° C., pumped into the container and exposed to a liquid pressure of 14 bar. This pressure is maintained for 240 minutes, with the impregnation liquid being kept in circulation during this time. Then the impregnation liquor is pumped out of the container and an aftervacuum is established for 10 minutes to prevent dripping. The wood boards are completely saturated with the impregnation liquor and can be dried in the conventional manner.

After drying, the boards were found to have an active substance content averaging 6.5 per cent by weight. Moreover, they had a red-brown coloration. The wood could be sawed into small pencil boards 73×5×185 mm in size.

The small boards showed excellent processability and sharpenability. Here, too, the antistatic effect of the impregnation agent was reflected in improved removal of the shavings and a reduced danger of dust explosion.

The service life of the tools could be extended to four times the use period by the reduction in machining resistance.

All the writing, drawing and painting instruments or other objects made with the small boards so impregnated could be easily sharpened, carved or otherwise worked and they also met the high demands placed on such articles. In particular, they were also easy to varnish.

What is claimed is:

1. A wood-impregnating agent, comprising at least one of an emulsion, a dispersion and a solution of a surfactant, the surfactant being selected from the group consisting of a cationic compound, a quaternary compound, an amphoteric compound and a non-ionic compound which can be protonated on a heteroatom, and mixtures thereof, wherein the surfactant is poorly soluble in water and contains insoluble residues, wherein the insoluble residues of the surfactant remain as disperse phase and wherein the insoluble residues have a mean particle or droplet diameter of less than 1 $\mu$m.

2. The impregnating agent according to claim 1, wherein the cationic or quaternary surfactant is selected from the group consisting of imidazolines, benzyls, alkyls, dialkyls, monoalkyl-trimethyl, dialkyl-dimethyl, methyl-dialkoxyalkyl, dialkylmethylbenzyl, and diamidoamine.

3. The impregnating agent according to claim 1, wherein the cationic or quaternary surfactant is a complex diquaternary compound.

4. The impregnating agent according to claim 1, wherein the surfactant is a non-ionic compound selected from the group consisting of fatty amine oxides, amine ethoxylate, and adducts of an ethylene oxide, which can be protonated on an heteroatom and assume a cationic character in an acid medium.

5. The impregnating agent according to claim 1, wherein the surfactant is an amphoteric compound selected from the group consisting of betaines and ampholytes.

6. The impregnating agent according to claim 1, comprising 35.00 per cent by weight of 1-stearic acid amidoethyl-2-stearyl-3-methyl-imidazoline methosulfate and 65.00 per cent by weight of water.

7. The impregnating agent according to claim 1, comprising 38.00 per cent by weight of alkyl dimethyl benzyl ammonium chloride and 62.00 per cent by weight of water.

8. The impregnating agent according to claim 1, comprising 40.00 per cent by weight of distearyl dimethyl ammonium chloride and 60.00 per cent by weight of water.

9. The impregnating agent according to claim 1, comprising 35.00 per cent by weight of stearin amine ethoxylate with 5 mol ethylene oxide and 65.00 per cent by weight of water.

10. The impregnating agent according to claim 1, comprising 32.00 per cent by weight of distearyl dimethyl ammonium chloride, 67.2 per cent by weight of water and 0.8 per cent by weight of a 20% aqueous pigment preparation.

* * * * *